(12) United States Patent
Bhan et al.

(10) Patent No.: US 8,170,547 B1
(45) Date of Patent: May 1, 2012

(54) DYNAMIC ADJUSTMENT OF A BASE TRANSCEIVER STATION IN A WIRELESS COMMUNICATION SYSTEM

(75) Inventors: Ashish Bhan, Shawnee, KS (US);
Anoop Goyal, Overland Park, KS (US);
Manish Padte, Overland Park, KS (US);
Hemanth Balaji Pawar, Overland Park, KS (US); Michael E. Shafer, Jr., Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1124 days.

(21) Appl. No.: 12/016,070

(22) Filed: Jan. 17, 2008

(51) Int. Cl.
*H04W 24/00* (2009.01)
*H04W 36/00* (2009.01)
*H04W 4/00* (2009.01)
*H04B 17/00* (2006.01)
*H04M 3/00* (2006.01)

(52) U.S. Cl. .................. 455/424; 455/67.11; 455/418; 455/423; 455/436; 370/331

(58) Field of Classification Search .................. 455/418, 455/423–425, 67.11
See application file for complete search history.

(56) References Cited

U.S. PATENT DOCUMENTS

| 6,067,290 | A | | 5/2000 | Paulraj et al. |
| 6,141,565 | A | * | 10/2000 | Feuerstein et al. ............ 455/560 |
| 6,275,695 | B1 | * | 8/2001 | Obhan ......................... 455/423 |
| 6,515,975 | B1 | | 2/2003 | Chheda et al. |
| 6,603,966 | B1 | * | 8/2003 | Sheffield ....................... 455/423 |
| 6,996,374 | B1 | * | 2/2006 | Bao et al. ................... 455/67.11 |
| 7,206,574 | B2 | | 4/2007 | Bright et al. |
| 7,218,928 | B2 | | 5/2007 | Park et al. |
| 7,848,782 | B2 | * | 12/2010 | Stern-Berkowitz et al. .. 455/561 |
| 2005/0259591 | A1 | | 11/2005 | Moore et al. |
| 2006/0159048 | A1 | | 7/2006 | Han et al. |
| 2007/0037570 | A1 | * | 2/2007 | Donovan et al. ............. 455/423 |
| 2007/0217381 | A1 | | 9/2007 | Williams et al. |
| 2007/0225029 | A1 | * | 9/2007 | Abusch-Magder .......... 455/525 |
| 2011/0122866 | A1 | | 5/2011 | Vasamsetti et al. |

OTHER PUBLICATIONS

Office Action dated Dec. 7, 2011, U.S. Appl. No. 12/480,679, filed Jun. 8, 2009.

* cited by examiner

*Primary Examiner* — Dwayne Bost
*Assistant Examiner* — Larry Sternbane (57) ABSTRACT

A system is provided for dynamic communication adjustment. The system includes a server that obtains data associated with a base transceiver station. The server also compares the data to at least one threshold. Additionally, the server promotes adjustment of an operational parameter of a base transceiver station based on the comparison. Furthermore, the server promotes readjustment of at least one operational parameter based on an at least weekly comparison of subsequently obtained data associated with the base transceiver station to at least one threshold.

4 Claims, 9 Drawing Sheets

DYNAMIC ADJUSTMENT OF A BASE TRANSCEIVER STATION IN A WIRELESS COMMUNICATION SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A base transceiver station (BTS) may comprise an electronic equipment cabinet or box coupled to an antenna system positioned on top of a tower or other structure. The base transceiver station may provide radio access from a mobile phone or other mobile electronics device to a communications network, thereby promoting voice and/or data communications service access to the mobile phone. A variety of mobile communications parameters may be configured during the initial installation and activation of a base transceiver station. Some of these mobile communication parameters may affect the number of active calls that may be supported concurrently by the base transceiver station, how large a coverage area the base transceiver station is able to provide, how much power is consumed by the base transceiver station, and others. Generally, these mobile communication parameters may affect both the quality of service experienced by mobile phone service subscribers and operational efficiency.

SUMMARY

The present disclosure provides computer implemented methods and systems for dynamic communication adjustment. In some embodiments, a system includes a server that obtains data associated with a base transceiver station. The server also compares the data to at least one threshold. Additionally, the server promotes adjustment of an operational parameter of a base transceiver station based on the comparison. Furthermore, the server promotes readjustment of at least one operational parameter based on an at least weekly comparison of subsequently obtained data associated with the base transceiver station to at least one threshold.

In some embodiments, data associated with a base transceiver station is obtained. The data is compared to at least one threshold. Other data associated with another base transceiver station is obtained. An operational parameter of the base transceiver station is adjusted based on the comparison and the other data. At least one operational parameter is readjusted based on an at least weekly comparison of subsequently obtained data associated with the base transceiver station to at least one threshold.

In some embodiments, a system includes a data store and a server. The server determines a communication condition. The server also obtains a prior adjustment for a base transceiver station from the data store based on the communication condition. Additionally, the server promotes adjustment of an operational parameter of the base transceiver station based on the prior adjustment.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Some operational parameters of a base transceiver station may be pre-set by equipment manufacturers. Setting the parameters for a base transceiver station may be a lengthy process that occupies several skilled and/or experienced engineers and some manual labor. The engineers may set the parameters so that the base transceiver station can handle calls under a wide variety of conditions, such as during rush hour traffic when the base transceiver station is handling many local calls and during the evening when the base transceiver station may need to assist nearby base transceiver stations in handling residential calls. The engineers may return to the base transceiver station annually to evaluate if the set parameters meet the average needs of the mobile devices served by the base transceiver station. Generally, such statically configured base transceiver station operating parameters may only provide a compromise of performance under the wide range of communications environments that may be experienced over time by the base transceiver station.

The present disclosure provides for methods and systems that regularly obtain data associated with a base transceiver station, compare the data to thresholds, and adjust the operating parameters of the base transceiver station based on the comparison. In some embodiments, a server may promote readjustment of the operating parameters of the base transceiver station on a daily or even hourly basis, in contrast to a team of engineers waiting for annual or semi-annual adjustments of operating parameters. The server may promote adjustment or readjustment by instructing a base transceiver station or an engineer to adjust or readjust an operating parameter. The server may promote adjustment of the parameters of the base transceiver station based on the currently obtained data, which reflects current communication conditions, rather than the average needs of mobile devices served by a base transceiver station over a long period of time, such as a year. The server may also obtain data from neighboring base transceiver stations to use in promoting adjustments to the operating parameters of the base transceiver station. Additionally, the server may determine a communication condition, such as a time of day, such that the server may promote adjustment of the operating parameters of the base transceiver station based on previous adjustments under the same communication condition, such as the same time of day. Furthermore, the server may store optimal adjustments associated with a communication condition for use under the same condition in the future.

Because the server may promote adjustments on the operating parameters of the base transceiver station based on current conditions, instead of long term averages, the server may promote adjustment of operating parameters that are traditionally not adjusted and operating parameters that are traditionally adjusted manually, such as traditionally hard-coded operating parameters and tilt or rotation of antennas. Due to quickly made adjustments and readjustments, the adjustments may balance the current needs between voice quality, coverage area, capacity, and performance. The server may base adjustments on a cost-benefit analysis, the needs of selected subscribers, and/or performance related metrics such as a dropped calls threshold. The server may also establish the optimal frequency for adjustments based on the responses indicated by subsequently obtained data. Communication service providers may improve customer service and save expenses by using the server to automatically promote adjustment of operating parameters based on current data, instead of employing teams of engineers to annually adjust parameters for average conditions, where the engineers' adjustments are not optimal for most conditions.

Figure 1:
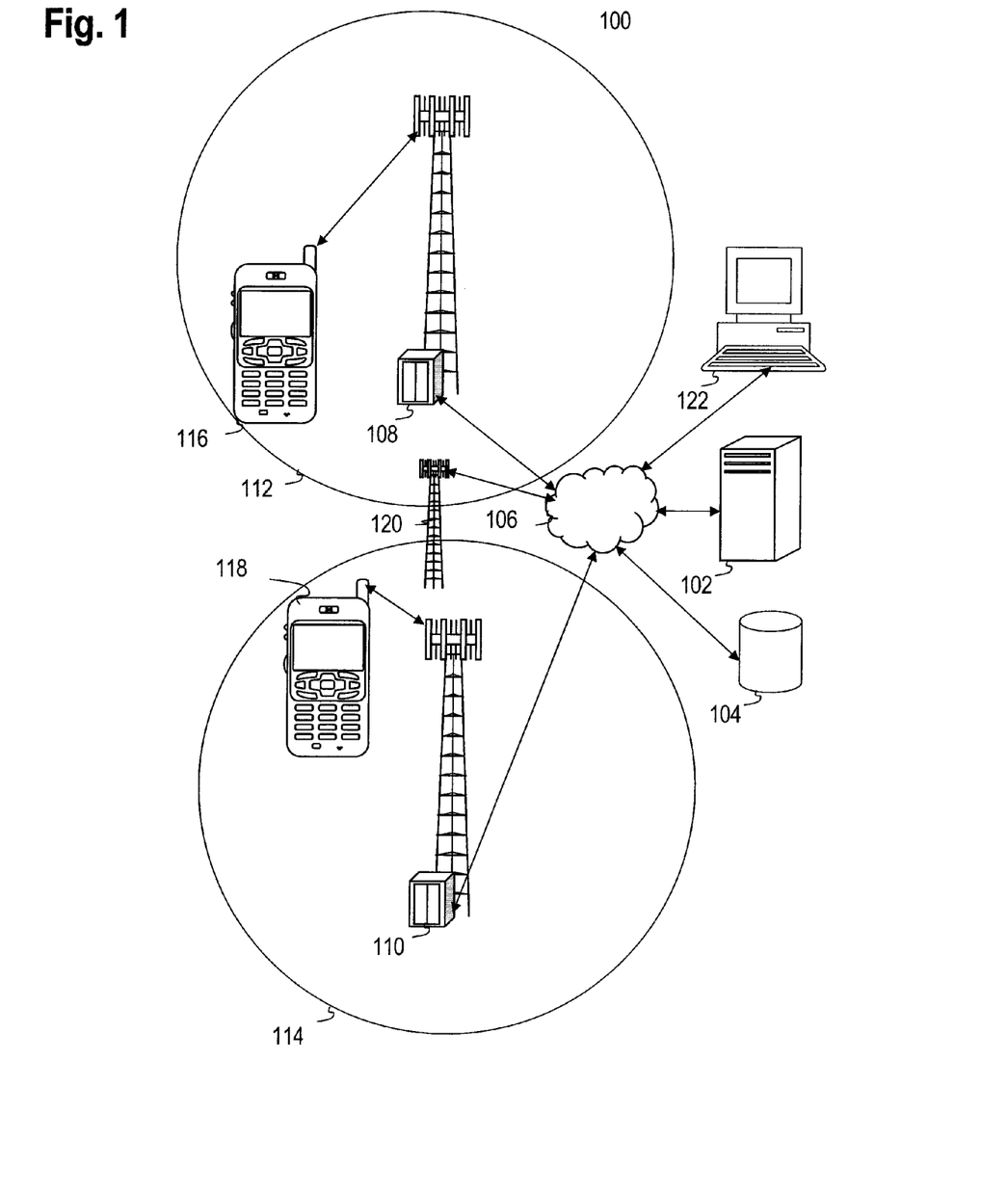
FIG. 1 illustrates a wireless communications system for dynamic communication adjustment according to some embodiments of the present disclosure.

FIG. 1 shows a wireless communications system 100 suitable for implementing several embodiments of the present disclosure. The wireless communication system 100 includes a server 102, a data store 104, a communication network 106, base transceiver stations 108-110, coverage areas 112-114, mobile devices 116-118, a fixed probe 120, and a user interface 122. The server 102 may communicate with the data store 104, the base transceiver stations 108-110, the fixed probe 120, and the user interface 122 via the communication network 106. The base transceiver stations 108-110 are associated with the coverage areas 112-114, respectively. The base transceiver stations 108-110 also communicate with the mobile devices 116-118, respectively, and communicate with the fixed probe 120.

The server 102 may obtain data associated with the base transceiver stations 108-110. Furthermore, the server 102 may communicate with the base transceiver stations 108-110 to obtain data associated with the mobile devices 116-118 that are within the coverage areas 112-114 of the base transceiver stations 108-110.

Additionally, the server 102 may communicate with the base transceiver stations 108-110 to obtain data associated with the fixed probe 120 within the coverage areas 112-114. The server 102 may promote adjustment of operational parameters of the base transceiver stations 108-110 based on this obtained data, which the server 102 may store in the data store 104. The server 102 may also store adjustments in the data store 104 and retrieve previous adjustments from the data store 104. Additionally, the server 102 may output this obtained data, the adjustments, and previous adjustments to the user interface 122.

The server 102 may be a general purpose computer. Though illustrated as mobile phones, the mobile devices 116-118 may take various forms including personal digital assistants (PDA), mobile computers, digital cameras, mobile telecommunication devices, digital music players, mobile handsets, handheld gaming devices, wireless mobile devices, pagers, portable computers, tablet computers, laptop computers, and digital calculators. Suitable mobile devices 116-118 may combine some or all of these functions. The mobile devices 116-118 may communicate via the base transceiver stations 108-110 and the communication network 106 by a standard wireless telephony protocol, such as code division multiple access (CDMA), global system for mobile communication (GSM), universal mobile telecommunications system (UMTS), and worldwide interoperability for microwave access (WiMAX), a wireless internet connection, or some other means of wireless communication.

The fixed probe 120 may receive signals from the base transceiver stations 108-110 and from the mobile devices 116-118, and send information about these signals to the server 102 via the base transceiver stations 108-110 and/or the communication network 106. While two base transceiver stations 108-110, two coverage areas 112-114, two mobile devices 116-118, one fixed probe 120, and one user interface 122 are shown in FIG. 1, the system 100 may include any number of base transceiver stations 108-110, coverage areas 112-114, mobile devices 116-118, fixed probes 120, and user interfaces 122.

Figure 2:
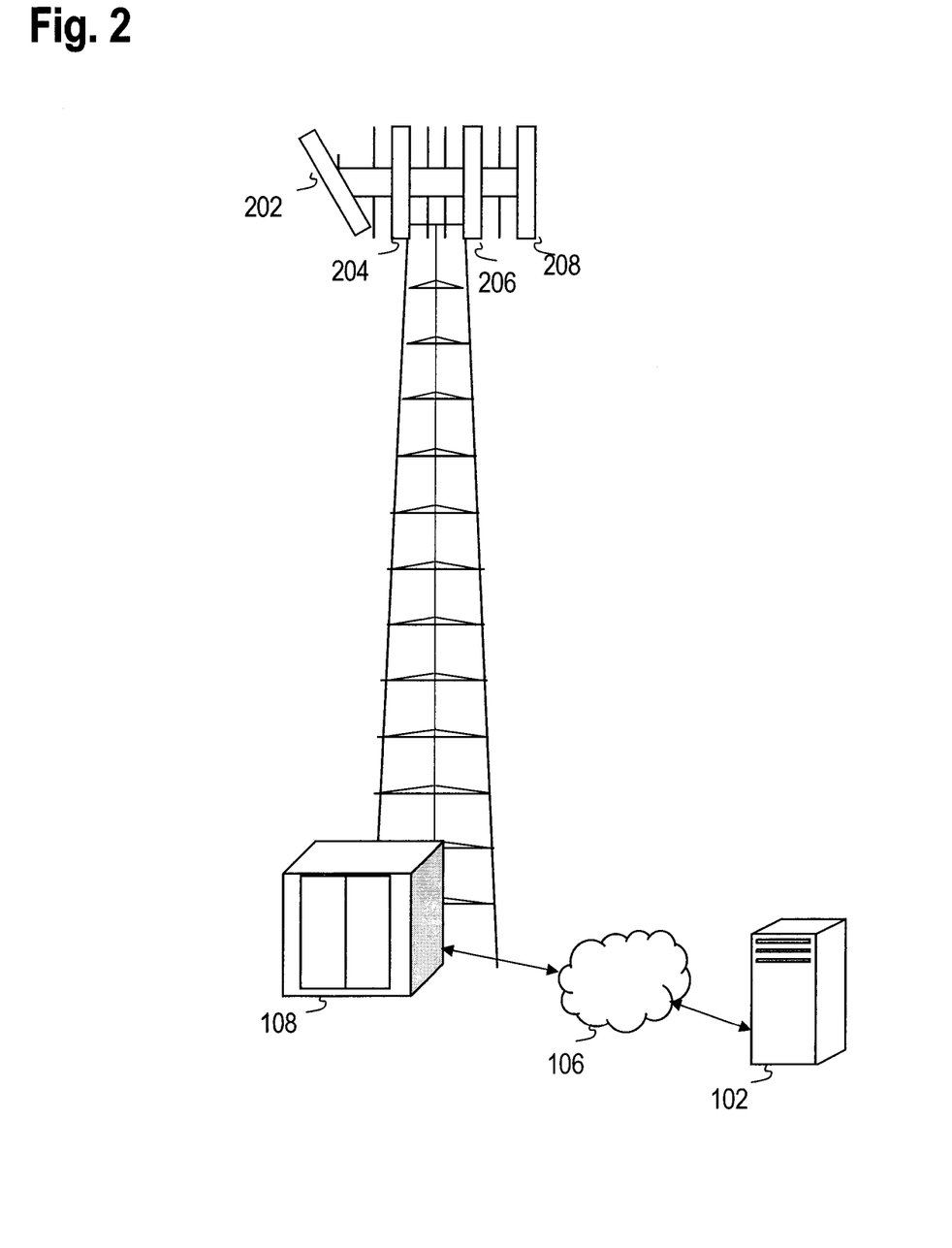
FIG. 2 illustrates a base transceiver station for dynamic communication adjustment according to some embodiments of the present disclosure.

FIG. 2 shows the base transceiver station 108 for dynamic communication adjustment according to some embodiments of the present disclosure. The base transceiver station 108 includes antennas 202-208, which may be automatically adjustable antennas. The server 102 may communicate with the base transceiver station 108 via the communication network 106. The server 102 may promote adjustment of an operational parameter for the base transceiver station 108, for example, by sending instructions that rotate or tilt the antennas 202-208. In FIG. 2, the server 102 instructs the base transceiver station 108 to adjust the tilt of antenna 202.

Figure 3:
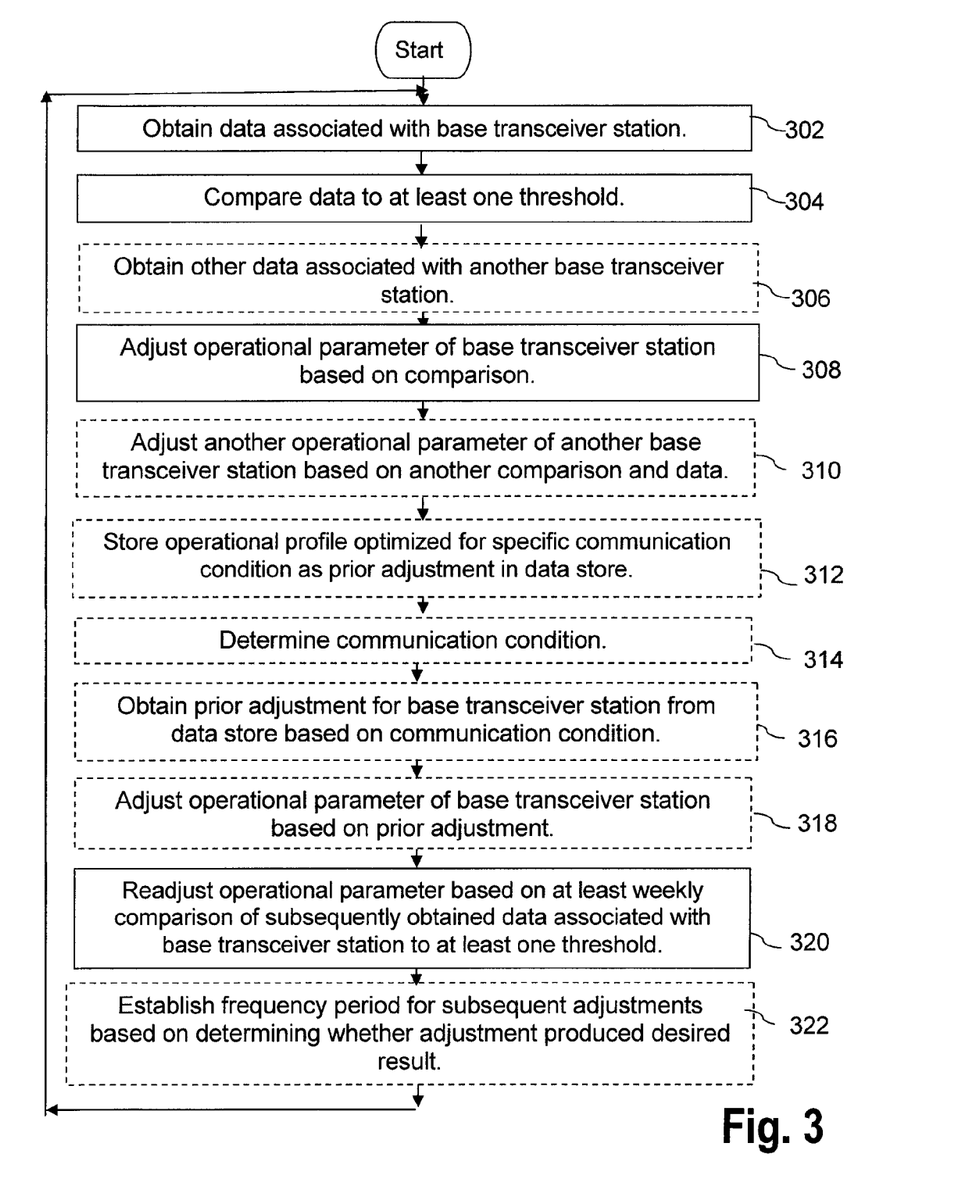
FIG. 3 is a flowchart of a method for dynamic communication adjustment according to some embodiments of the present disclosure.

FIG. 3 is a flowchart illustrating a method for dynamic communication adjustment according to some embodiments of the present disclosure. The server 102 may execute the method to promote adjustment of operational parameters for the base transceiver stations 108-110 based on data associated with the base transceiver stations 108-110, and to promote readjustment of the operational parameters based on weekly comparisons of thresholds to data associated with the base transceiver stations 108-110, or based on comparisons conducted on another periodic or non-periodic interval.

In box 302, data associated with a base transceiver station is obtained. The data may be associated with the mobile device 116, the base transceiver station 108, and/or the fixed probe 120. Furthermore, the data may be associated with a voice quality, a coverage area, a dropped call, a hand down failure, a carrier balance, an averaged mobile device signal power, a traffic load, a maximum transmitter power, pilot strength, orthogonal frequency division multiple access (OFDMA) channel quality indicators (CQI), and/or channel availability. For example, the server 102 obtains data from the fixed probe 120 for the coverage area 112 associated with the base transceiver station 108. The base transceiver station 108 may analyze data before the server 102 obtains the data, such that the obtained data is a data summary for the data associated with the base transceiver station 108, not just massive amounts of unanalyzed data.

In box 304, data is compared to at least one threshold. For example, the server 102 compares data for the coverage area 112 to a threshold for the coverage area 112 to determine if the coverage area 112 is sufficient for a coverage area assigned to the base transceiver station 108.

In box 306, other data associated with another base transceiver station is optionally obtained. For example, the server 102 obtains data from the fixed probe 120 for the coverage area 114 associated with the base transceiver station 110.

In box 308, an operational parameter of the base transceiver station is adjusted based on the comparison. The adjustment may be a base transceiver station antenna tilt or a base transceiver station antenna rotation. For example, the server 102 promotes adjustment of the antenna tilt for the antenna 202 based on the comparison.

An operational parameter may be a parameter associated with a radio frequency loading factor, a dynamic hand down distance, a pilot signal power, a supplemental channel admission threshold, an overhead and traffic channel power, a voice power control, a data power control, a handoff, a subscriber access control, or timing and access. Descriptions of FIG. 4 through FIG. 7 illustrate examples of adjusting some of these operational parameters.

The operational parameters of the base transceiver station adjusted by the server 102 may include operational parameters which are traditionally not adjusted frequently. For example, the server 102 may adjust the combination of the parameters associated with the overhead and traffic channel power, the voice power control, and the data power control. The server 102 may successively adjust each of the combination of parameters in turn multiple times, measuring or determining base transceiver station performance after each round of adjustments or after each individual parameter adjustment to serve as a basis for determining the next round of adjustments. The successive adjustments may be determined with the understanding that adjustments to one of the combination of parameters may alter the preferred setting of one or more of the other of the combination of parameters, to converge on a substantially preferred or substantially optimal performance. The parameters associated with the overhead and traffic channel power may also be categorized as parameters associated with the overhead channel power and parameters associated with the traffic channel power. Likewise, parameters associated with the voice power control and the data power control may be categorized as parameters associated with the power control. In another example, the server 102 may adjust the combination of the parameters associated with the overhead channel power, the traffic channel power, and the power control.

The adjustment may be based on balancing considerations for voice quality, dropped calls, offered traffic, and coverage area. For example, if the server 102 promotes adjustment of an operational parameter to increase the coverage area 112, the larger coverage area served by the base transceiver station 108 may result in more dropped calls for the mobile device 116. More dropped calls may result when the mobile device 116 is located in the increased coverage area 112, which offers a diminished signal power over the coverage area 112.

Adjusting an operational parameter of a base transceiver station may be based on mobile device subscribers with more dropped calls than a dropped calls threshold. For example, if the server 102 determines that a substantial number of subscribers in the coverage area 112 have recently experienced more dropped calls than a dropped calls threshold, the server 102 may promote adjustment of the antenna 202 to decrease the coverage area 112.

Adjusting an operational parameter of a base transceiver station may be based on an adjustment cost and/or an adjustment benefit. For example, if the server 102 determines that adjusting the antenna 202 incurs only the small cost for operating an electrical engine that automatically adjusts the antenna 202, and determines that the results from this adjustment decreasing the coverage area 112 would benefit a specific number of subscribers in the area who have recently experienced more dropped calls than a dropped calls threshold, then the server 102 may balance the costs and benefits to make the adjustment decision.

Adjusting an operational parameter of a base transceiver station also may be based on data associated with subscriptions of selected mobile device subscribers, for example mobile device subscribers deemed to be high value subscribers. For example, a specific group of subscribers may pay premiums for services based on infrequent dropped call rates. Alternatively, a user profile of mobile device subscribers that contains demographics information about the subscriber, for example income level, residence address, education level, may be used to identify high value subscribers. The server 102 may promote adjustment of the antenna 202 to reduce dropped call rates or otherwise to increase service quality for the specific group of subscribers even if a substantial number of subscribers in the coverage area 112 have not recently experienced more dropped calls than the dropped calls threshold or even with the consequence that other lower value subscriber devices experience increased dropped calls or other decreased service quality. Because the adjustments of operational parameters of the base transceiver station 110 are dynamic and can be applied automatically and/or remotely, these adjustments can be made by the serving base transceiver station 110 as a high value subscriber migrates from one coverage area to another, for example from the coverage area 114 to the coverage area 112 associated with the base transceiver station 110 and the base transceiver station 108, respectively.

Adjusting an operational parameter of a base transceiver station may include outputting a request via a user interface. For example, if the server 102 determines to promote adjustment of the antenna 202 for the base transceiver station 108, but the base transceiver station 108 is not a base transceiver station with automatically adjusting antennas, the server 102 may output a request for a technician to manually adjust the antenna 202.

A request may be for additional hardware. For example, if the comparison indicates that the coverage areas 112-114 for the base transceiver stations 108-110 are inadequate to cover the area covered by the fixed probe 120, the request may be to add an additional base transceiver station that has a coverage area that can adequately provide for the area covered by the fixed probe 120.

A request may be to shut down the base transceiver station. For example, if the comparison indicates that other base transceiver stations have been capable of covering the coverage area 112 for the base transceiver station 108 over a prolonged period of time, the request may be to shut down the base transceiver station 108.

In box 310, another operational parameter of another base transceiver station is optionally adjusted based on another comparison and the data. For example, the server 102 promotes adjustment of the antenna tilt for the base transceiver station 110 based on the data associated with the base transceiver station 108 and a comparison of data associated with the base transceiver station 110. The comparison may be of the coverage area 114 to a threshold for the coverage area 114 and the data may indicate that the coverage area 112 may not be sufficient for the coverage area assigned to the base transceiver station 108.

In box 312, an operational profile that is substantially optimized for a specific communication condition is stored as an adjustment in the data store. For example, the server 102 stores an antenna tilt for the base transceiver station 108 during working day mornings, Mondays through Fridays, as a prior adjustment in the data store 104. The communication condition may be based on a subscriber offered traffic demand, a sports event, an artistic performance, a time of the day, a day of the week, a school schedule, a holiday, a weather condition, a season of the year, and a tourist period. For example, the communication condition may be working day mornings, Mondays through Fridays, from 7:00 A.M. to 10:00 A.M. during rush hour traffic.

In another example, the communication condition may be based on institutional schedules. For example, if the base transceiver station 110 serves a university or high school campus, offered traffic demands may vary according to the university or high school schedule, and the operational parameters of the base transceiver station 110 may be adapted based on those known schedules. If the base transceiver station 110 serves a professional sports venue, for example a professional football stadium, offered traffic demands may vary according to the home team game schedule, and the operational parameters of the base transceiver station 110 may be adapted based on the known home game schedule. If the base transceiver station 110 serves a tourist area, for example a ski resort, offered traffic demands may vary according to a schedule of the ski resort, and the operational parameters of the base transceiver station 110 may be adapted based on the known ski resort schedule. The schedules of universities, high schools, sports teams, and ski resorts may change from year to year, and it is contemplated that these institutional schedules will be updated and provided to the system 100, for example to the server 102 or to the base transceiver station 110. The schedules may be provided by provisioning of an administrator of the system 100, for example using the user interface 122, or the schedules may be acquired automatically by the system 100.

In yet another example, the communication condition may be based upon seasonal variations. For example, wireless shadowing conditions may be different during summer months when deciduous trees are in full leaf than during winter months when the leaves of deciduous trees have dropped, and the operational parameters of the base transceiver station 110 may be adapted based on the foliage conditions in some service areas. In another example, different regions may experience distinctive seasonal precipitation patterns affecting wireless radio propagation, and the operational parameters of the base transceiver station 110 may be adapted based on the seasonal precipitation patterns in some service areas. In an embodiment, the communication conditions may comprise local weather forecasts, and the operational parameters of the base transceiver station 110 may be adapted according to the local weather forecast.

In box 314, a communication condition is determined. For example, the server 102 determines that a current date and time indicate a weekday morning between 7:00 A.M. to 10:00 A.M. The server 102 may also determine that a current date and time indicate that the current communication condition matches any of the other communication conditions for which an operational profile is stored. The server 102 may determine a communication condition based on a schedule, such as a schedule of games for a professional football team, or based on obtaining data associated with a base transceiver station.

In box 316, a prior adjustment for a base transceiver station is obtained from the data store based on the communication condition. For example, the server 102 obtains the adjustment for the antenna tilt for the base transceiver station 108 based on weekday mornings during rush hour traffic from the data store 104.

In box 318, an operational parameter of a base transceiver station is adjusted based on the prior adjustment. For example, the server 102 promotes adjustment of the antenna tilt for the base transceiver station 108 based on the antenna tilt for the base transceiver station 108 during prior weekday mornings rush hour traffic. If the prior adjustment is based on a schedule, the server 102 may promote adjustment of an operational parameter based on the prior adjustment. If the prior adjustment is not based on a schedule, the server 102 may gradually promote adjustment of an operational parameter as the server 102 gradually determines the communication condition based on data obtained from the base transceiver station 108.

In box 320, an operational parameter is readjusted based on an at least weekly comparison of subsequently obtained data associated with a base transceiver station to at least one threshold. For example, after one hour the method returns to box 302 and the server 102 promotes readjustment of the antenna tilt for the base transceiver station 108 based on a comparison of subsequently obtained data for the coverage area 112 to a coverage area threshold that indicates the adjustment made one hour ago has not yet produced the desired coverage area. In another example, if a comparison of subsequently obtained data for the coverage area 114 to another coverage area threshold indicates that a previous adjustment has not yet produced the desired coverage area, the server 102 promotes readjustment of the combination of the parameters associated with the overhead and traffic channel power, the voice power control, and the data power control.

In box 322, a frequency period for subsequent adjustments is established based on determining whether the adjustment produced a desired result. The server 102 may establish a frequency period for subsequent adjustments based on a communication condition. For example, if the server 102 promotes adjustment of the antenna tilt for the base transceiver station 108 based on a three hour period associated with morning rush hour traffic, the method may return to box 302 one hour later so that the server 102 may compare subsequently obtained data with a threshold condition to insure that the adjustment produced the desired result within the specified time period. If the adjustment did not produce the desired result, the server 102 has time to promote making another adjustment of any operational parameter to produce the desired result before the communication condition expires. If the server 102 determines that the adjustment produced the desired result, the server 102 may promote adjustment of the frequency period for subsequent comparisons and adjustments to be longer. In another example, the server 102 may determine that readjusting antenna tilt every half hour is too frequent of a time period for antenna readjustment because the system 100 needs more than a half hour to settle after such adjustments.

Figure 4:
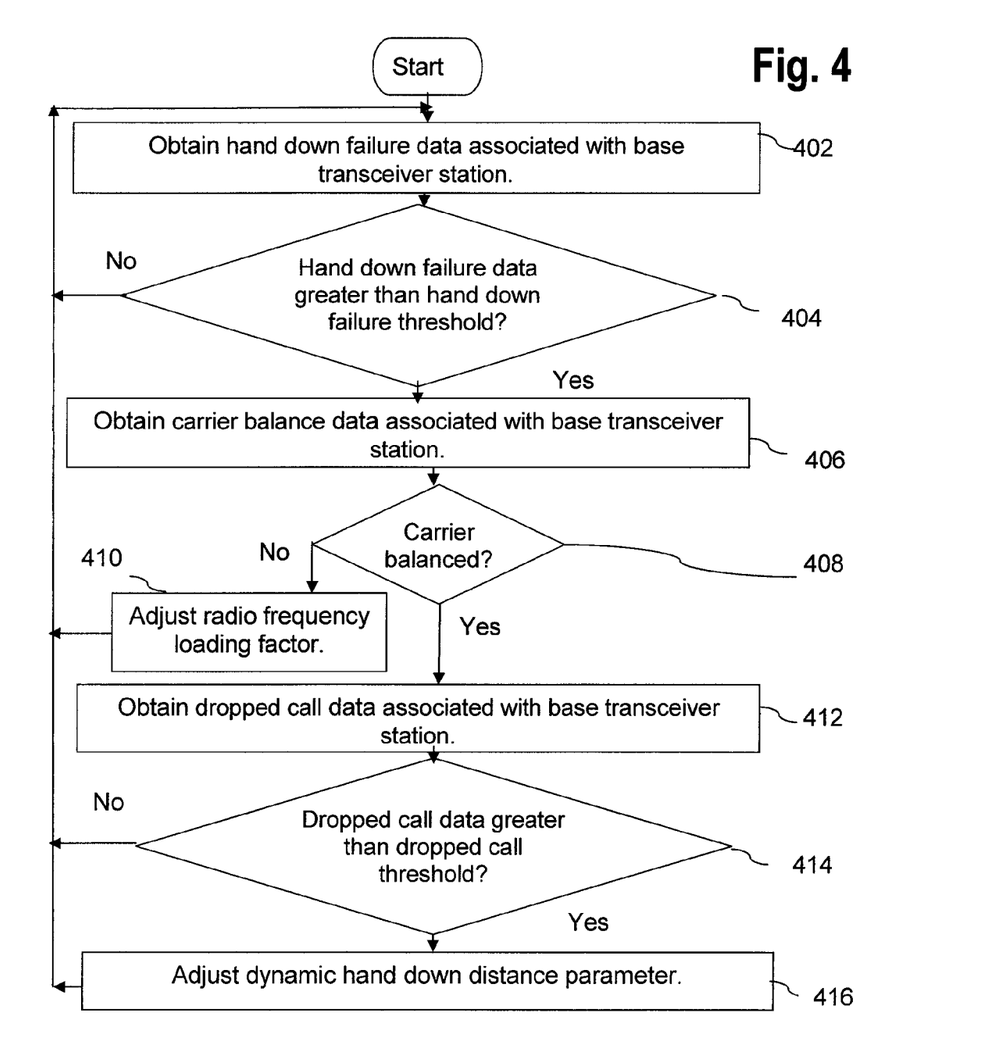
FIG. 4 is a flowchart of another method for dynamic communication adjustment according to some embodiments of the present disclosure.

FIG. 4 is a flowchart illustrating another method for dynamic communication adjustment according to some embodiments of the present disclosure. The server 102 executes the method to promote adjustment of a dynamic hand down distance parameter based on hand down failures and dropped calls.

In box 402, hand down failure data associated with base transceiver station is obtained. For example, the server 102 obtains data that specifies a number of occasions when the base transceiver station 108 attempted to hand a call down from a higher frequency to a lower frequency and inadvertently dropped the call.

In box 404, whether the hand down failure data is greater than a hand down failure threshold is determined. For example, the server 102 determines whether the base transceiver station 108 has dropped more calls handing down from one frequency to another than a specific hand down failure threshold. If the server 102 determines that the hand down failure data is not greater than the hand down failure threshold, the method returns to box 402 because a hand down failure problem does not currently exist. If the server 102 determines that the hand down failure data is greater than the hand down failure threshold, the method continues to box 406 to address the hand down failures.

In box 406, carrier balance data associated with a base transceiver station is obtained. Multiple frequency bands, or carriers, may be employed by a base transceiver station to concurrently support a number of active calls. A carrier imbalance for the base transceiver station is deemed to exist when one carrier employed by the base transceiver station is supporting substantially more calls than the number of calls supported by another carrier employed by the base transceiver station. For example, the server 102 obtains data that specifies how many calls are on each carrier for the base transceiver station 108, such as 90% of full capacity on one carrier and 20% of full capacity on another carrier.

In box 408, whether a carrier is balanced is determined. For example, the server 102 determines whether the number of calls on each carrier is somewhat balanced or if a wide discrepancy exists between the number of calls on some of the carriers. If the server 102 determines that the carrier is not balanced, the method continues to box 410 to address the carrier imbalance. If the server 102 determines that a carrier is balanced, the method proceeds to box 412.

In box 410, a radio frequency loading factor is adjusted. For example, the server 102 promotes adjustment of the radio frequency loading factor to balance the number of calls on each carrier. Because the carrier imbalance may have impacted the number of hand down failures, the method returns to box 402 because the carrier balancing may remedy the hand down failure problems.

In box 412, dropped call data associated with a base transceiver station is obtained. For example, the server 102 obtains data that specifies the total rate of dropped calls for the base transceiver station 108, not just the rate of dropped calls due to hand down failures. The total rate of dropped calls also includes calls dropped due to other reasons, such as weak signals, hardware problems, and software problems.

In box 414, whether dropped call data is greater than a dropped call threshold is determined. For example, the server 102 determines whether the number of dropped calls for the base transceiver station 108 exceeds a dropped call threshold that indicates a dropped calls problem. If the server 102 determines that the dropped call data is not greater than the dropped call threshold, the method returns to box 402. If the server 102 determines that the dropped call data is greater than the dropped call threshold, the method continues to box 416.

In box 416, a dynamic hand down distance parameter is adjusted. For example, the server 102 promotes adjustment of the dynamic hand down distance parameter by adjusting hand off parameters, which are listed below, thereby affecting the origination attempts locations and hand down targets. A change in traffic pattern might result in origination attempts being made outside the hand down distance previously configured. Calls made outside the threshold may still originate on a higher carrier and immediately hand down to targets specified that may not be ideal. The method returns to box 402 to continue monitoring for high hand down failures.

Figure 5:
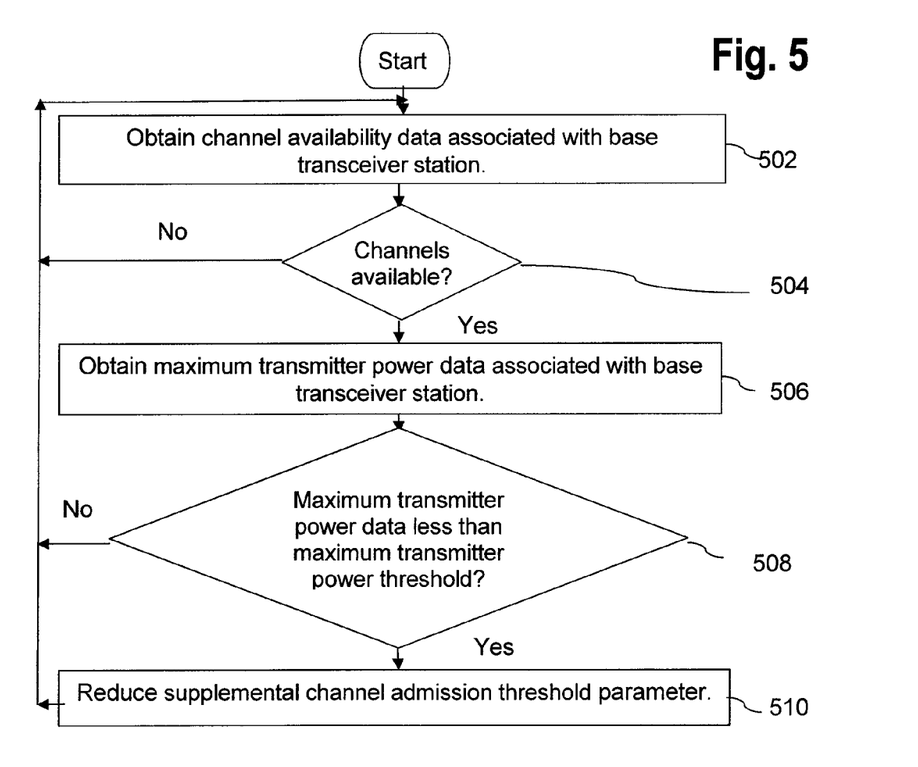
FIG. 5 is a flowchart of yet another method for dynamic communication adjustment according to some embodiments of the present disclosure.

FIG. 5 is a flowchart illustrating yet another method for dynamic communication adjustment according to some embodiments of the present disclosure. The server 102 executes the method to promote decrease of a supplemental channel admission threshold parameter based on channel availability data and maximum power data.

In box 502, channel availability data associated with a base transceiver station is obtained. For example, the server 102 obtains data that specifies channel availability, or a number of channels available for voice or data transmission, associated with the base transceiver station 108.

In box 504, whether channels are available is determined. For example, the server 102 determines whether a specific number of channels are available. If server 102 determines that the specific number of channels is not available for the base transceiver station 108, the method returns to box 502 because the load on a sector carrier is too high to make more channels available. If the server 102 determines that the specific number of channels is available for the base transceiver station 108, the method continues to box 506.

In box 506, maximum transmitter power data associated with a base transceiver station is obtained. For example, the server 102 obtains data that specifies the current transmitter power for the base transceiver station 108.

In box 508, whether the maximum transmitter power data is less than a maximum transmitter power threshold is determined. For example, the server 102 determines whether the maximum transmitter power data for the base transceiver station 108 is less than a specific maximum transmitter power threshold. If the server 102 determines that the maximum transmitter power data for the base transceiver station 108 is not less than a maximum transmitter power threshold, the method returns to box 502. If the server 102 determines that the maximum transmitter power data is less than a maximum transmitter power threshold, the method continues to box 510.

In box 510, a supplemental channel admission threshold parameter is reduced. For example, the server 102 promotes reduction of the supplemental channel admission threshold parameter to increase the probability of being assigned a higher burst of supplemental channels when loading on the sector carrier is minimum, thereby increasing throughput.

Figure 6:
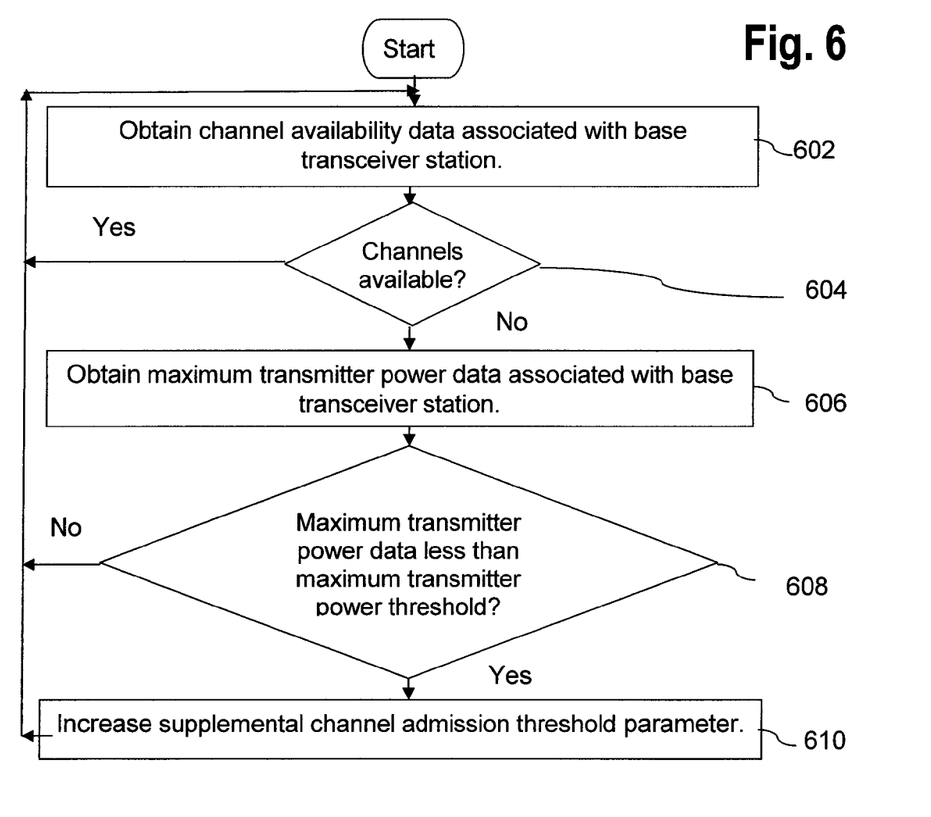
FIG. 6 is a flowchart of an alternative method for dynamic communication adjustment according to some embodiments of the present disclosure.

FIG. 6 is a flowchart illustrating an alternative method for dynamic communication adjustment according to some embodiments of the present disclosure. The server 102 executes the method to promote increase of a supplemental channel admission threshold parameter based on channel availability data and maximum power data.

In box 602, channel availability data associated with a base transceiver station is obtained. For example, the server 102 obtains data that specifies channel availability, or a number of channels available for voice or data transmission, associated with the base transceiver station 108.

In box 604, whether channels are available is determined. For example, the server 102 determines whether a specific number of channels is available. If server 102 determines that the specific number of channels is available for the base transceiver station 108, the method returns to box 602 because the load on a sector carrier is low enough to make more channels available. A sector carrier is a frequency band associated with one of the subdivisions of a mobile phone network cell provided by a single directional antenna. If the server 102 determines that the specific number of channels is not available for the base transceiver station 108, the method continues to box 606.

In box 606, maximum transmitter power data associated with a base transceiver station is obtained. For example, the server 102 obtains data that specifies the current transmitter power for the base transceiver station 108.

In box 608, whether the maximum transmitter power data is less than a maximum transmitter power threshold is determined. For example, the server 102 determines whether the maximum transmitter power data for the base transceiver station 108 is less than a maximum transmitter power threshold. If the server 102 determines that the maximum transmitter power data for the base transceiver station 108 is not less than the maximum transmitter power threshold, the method returns to box 602. If the server 102 determines that the maximum transmitter power data is less than the maximum transmitter power threshold, the method continues to box 610.

In box 610, a supplemental channel admission threshold parameter is increased. For example, the server 102 promotes increase of the supplemental channel admission threshold parameter to decrease the probability of being assigned a higher burst of supplemental channels when loading on the sector carrier is maximum, thereby reducing throughput. However, increasing the supplemental channel admission threshold provides resources to accommodate the voice traffic without any performance degradation.

Figure 7:
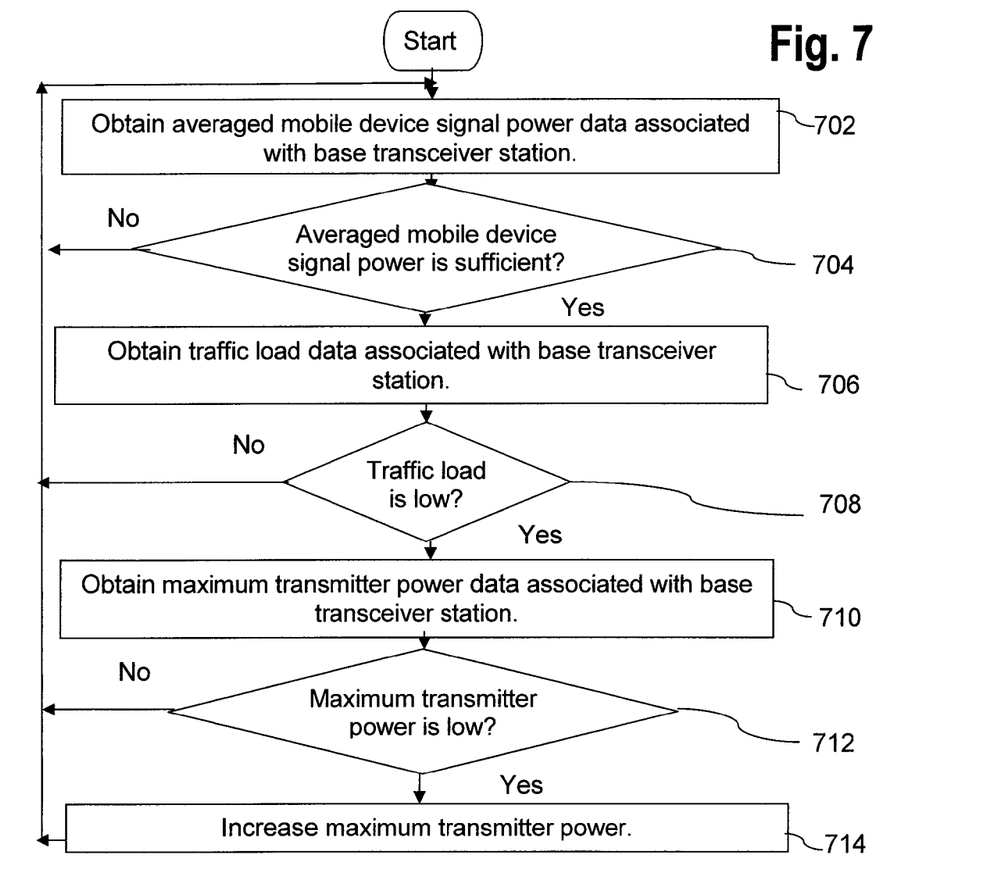
FIG. 7 is a flowchart of an additional method for dynamic communication adjustment according to some embodiments of the present disclosure.

FIG. 7 is a flowchart illustrating an additional method for dynamic communication adjustment according to some embodiments of the present disclosure. The server 102 executes the method to promote increase of a maximum transmitter power based on signal power and traffic load.

In box 702, averaged mobile device signal power data associated with a base transceiver station is obtained. For example, the server 102 obtains data that specifies the averaged mobile device signal power based on pilot strength measurements associated with the base transceiver station 108.

In box 704, whether averaged mobile device signal power is sufficient is determined. For example, the server 102 determines whether the averaged mobile device signal power for the base transceiver station 108 is sufficient based on a power threshold. If the server 102 determines that the averaged mobile device signal power is not sufficient, the method returns to box 702. If the server 102 determines that the averaged mobile device signal power is sufficient, the method continues to box 706.

In box 706, traffic load data associated with a base transceiver station is obtained. For example, the server 102 obtains data that specifies the traffic load associated with the base transceiver station 108.

In box 708, whether the traffic load is low is determined. For example, the server 102 determines whether the traffic load for the base transceiver station 108 is below a traffic load threshold. If the server 102 determines that the traffic load is not low, the method returns to box 702. If the server 102 determines that the traffic load is low, the method continues to box 710.

In box 710, maximum transmitter power data associated with a base transceiver station is obtained. For example, the server 102 obtains data that specifies the current transmitter power for the base transceiver station 108.

In box 712, whether the maximum transmitter power is low is determined. For example, the server 102 determines whether the maximum transmitter power for the base transceiver station 108 is below a maximum power threshold. If the server 102 determines that the maximum transmitter power is not low, the method returns to box 702. If the server 102 determines that the maximum transmitter power is low, the method continues to box 714.

In box 714, maximum transmitter power is increased. For example, the server 102 promotes increase of the current transmitter power for the base transceiver station 108. The power for the base transceiver station 108 may be increased because the pilot strength measurements are sufficient, the traffic load is low, and the current power is low. Then the method returns to box 702.

Figure 8:
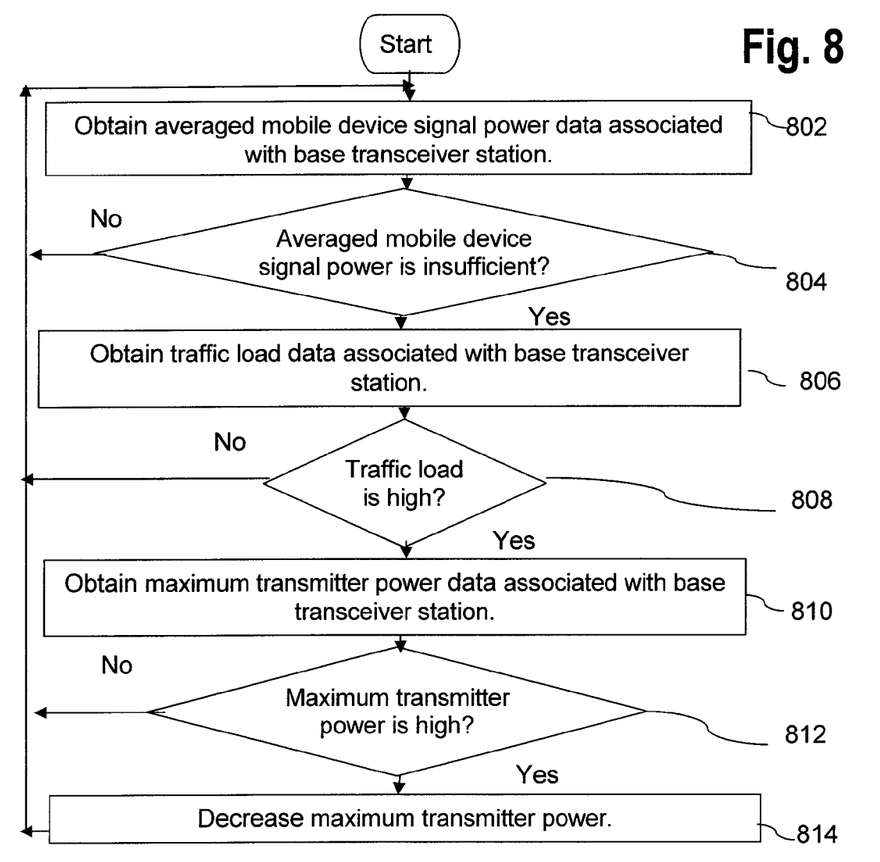
FIG. 8 is a flowchart of a further method for dynamic communication adjustment according to some embodiments of the present disclosure.

FIG. 8 is a flowchart illustrating a further method for dynamic communication adjustment according to some embodiments of the present disclosure. The server 102 executes the method to promote decrease of a maximum transmitter power based on signal power and traffic load.

In box 802, averaged mobile device signal power data associated with a base transceiver station is obtained. For example, the server 102 obtains data that specifies the averaged mobile device signal power based on pilot strength measurements associated with the base transceiver station 108.

In box 804, whether averaged mobile device signal power is insufficient is determined. For example, the server 102 determines whether the averaged mobile device signal power for the base transceiver station 108 is insufficient based on a power threshold. If the server 102 determines that the averaged mobile device signal power is not insufficient, the method returns to box 802. If the server 102 determines that the averaged mobile device signal power is insufficient, the method continues to box 806.

In box 806, traffic load data associated with a base transceiver station is obtained. For example, the server 102 obtains data that specifies the traffic load associated with the base transceiver station 108.

In box 808, whether the traffic load is high is determined. For example, the server 102 determines whether the traffic load for the base transceiver station 108 is above a traffic load threshold. If the server 102 determines that the traffic load is not high, the method returns to box 802. If the server 102 determines that the traffic load is high, the method continues to box 810

In box 810, maximum transmitter power data associated with a base transceiver station is obtained. For example, the server 102 obtains data that specifies the current transmitter power for the base transceiver station 108.

In box 812, whether the maximum transmitter power is high is determined. For example, the server 102 determines whether the maximum transmitter power for the base transceiver station 108 is above a maximum power threshold. If the server 102 determines that the maximum transmitter power is not high, the method returns to box 802. If the server 102 determines that the maximum transmitter power is high, the method continues to box 814.

In box 814, maximum transmitter power is decreased. For example, the server 102 promotes decrease of the current transmitter power for the base transceiver station 108. The power for the base transceiver station 108 may be decreased because the pilot strength measurements are insufficient, the traffic load is high, and the current power is high. Then the method returns to box 802.

Operational parameters may be classified in six categories: overhead and traffic channel power parameters, voice power control parameters, data power control parameters, handoff parameters, timing and access parameters, and subscriber access control parameters. The overhead and traffic channel power parameters may include parameters associated with nominal traffic channel gain radio configuration 1, minimum traffic channel gain radio configuration 1, and maximum traffic channel gain radio configuration 1. The overhead and traffic channel power parameters may also include parameters associated with nominal traffic channel gain radio configuration 2, minimum traffic channel gain radio configuration 2, maximum traffic channel gain radio configuration 2, pilot channel gain, paging channel gain, and synchronization channel gain.

The voice power control parameters may include parameters associated with enable forward link power control, forward frame error rate, nominal gain, minimum traffic channel digital gain, maximum traffic channel digital gain, lower forward link threshold, upper forward link threshold, forward power control timer, power report delay, power control reporting frames, small gain increment, and forward frame error rate. The voice power control parameters may further include parameters associated with nominal traffic digital gain, target frame error rate for high capacity, enable reverse outer loop power control, reverse link frame error rate, nominal signal to noise ratio, signal to noise set-point minimum, signal to noise set-point maximum, full rate erasure set-point increase, erasure set-point increase, and erasure/full likely set-point increase.

Additionally, the voice power control parameters may include parameters associated with full rate run, erasure recovery period, erasure run length, quarter/eighth rate set-point decrease, forward radio control configuration, preferred 8k forward radio control, alternative preferred 8k forward radio control, preferred 8k forward radio control for carriers using alternative list, and voice forward fundamental channel. Furthermore, the voice power control parameters may include parameters associated with voice forward fundamental channel power control outer loop, voice forward fundamental channel power control inner loop step size for simplex, voice forward fundamental channel power control inner loop step size for two or more, and voice forward fundamental channel power control inner loop initial gain.

Moreover, the voice power control parameters may include parameters associated with voice forward fundamental channel power control inner loop minimum gain for simplex, voice forward fundamental channel power control inner loop minimum gain for two or more, and voice forward fundamental channel power control inner loop minimum gain for three or more. In addition, the voice power control parameters may include parameters associated with voice forward fundamental channel power control inner loop maximum gain for simplex, voice forward fundamental channel power control inner loop maximum gain for two or more, code division multiple access (CDMA) power control voice for simplex, CDMA power control voice for two or more, and CDMA power control voice for three or more. Also, the voice power control parameters may include parameters associated with reverse power control for power control active, voice reverse fundamental channel power control outer loop, reverse power control for power offset, reverse power control for power offset of reverse pilot, CDMA power control, and adjustment gain for one eighth rate frames.

The data power control parameters may include parameters associated with voice forward fundamental channel power control inner loop step size for simplex, voice forward fundamental channel power control inner loop step size for two or more, data forward fundamental channel power control outer loop for simplex, and data forward fundamental channel power control outer loop for two or more. The data power control parameters may also include parameters associated with data forward fundamental channel power control inner loop minimum gain for simplex, data forward fundamental channel power control inner loop minimum gain for two or more, and data forward fundamental channel power control inner loop minimum gain for three or more.

The data power control parameters may further include parameters associated with data forward fundamental channel power control inner loop maximum gain for simplex, data forward fundamental channel power control inner loop maximum gain for two or more, data forward fundamental channel power control inner loop initial gain, outer loop set-point for simplex minimum, and outer loop set-point for simplex initial. Additionally, the data power control parameters may include parameters associated with outer loop set-point for simplex maximum, outer loop set-point for two or more minimum, outer loop set-point for two or more initial, outer loop set-point for two or more maximum, inner loop minimum gain simplex, inner loop minimum gain two-way, inner loop minimum gain three-way, and inner loop maximum gain simplex.

Furthermore, the data power control parameters may include parameters associated with inner loop maximum gain two-way, CDMA power control data for simplex, CDMA power control data for two-way, CDMA power control data for three-way, maximum gain offset for softer handoff, minimum set-point offset for softer handoff, and maximum set-point offset for softer handoff. Moreover, the data power control parameters may include parameters associated with data forward secondary channel power control for inner loop power control step size, maximum gain allowed relative to forward pilot, data forward secondary channel power control, minimum set-point offset for softer handoff, maximum set-point offset for softer handoff, and maximum gain offset for softer handoff.

In addition, the data power control parameters may include parameters associated with reverse power control for power control active, voice reverse fundamental channel power control outer loop setup size, reverse power control power offset, data reverse fundamental channel power control, data reverse fundamental channel power control set-point minimum, and data reverse fundamental channel power control set-point initial. Also, the data power control parameters may include parameters associated with data reverse fundamental channel power control set-point maximum, reverse pilot fraction offset, power offset of reverse secondary channel to pilot for convolutional coding, power offset of reverse secondary channel to pilot for turbo coding, and data reverse secondary channel power control outer loop. The data power control parameters may include parameters associated with data reverse secondary channel power control set-point minimum, data reverse secondary channel power control set-point maximum, and data reverse secondary channel power control.

The handoff parameters may include parameters associated with traffic channel supervision interval, request for pilot measurements, traffic customer edges reserved for handoff, maximum neighbor list number sent to mobile, pilot detection threshold, pilot drop threshold, active against candidate set comparison, active against candidate set comparison threshold for analog, and drop timer. The handoff parameters may also include parameters associated with maximum number of active set pilots, paging channel neighbor list selection, CDMA to CDMA hand-down threshold, CDMA to analog hand-down threshold, CDMA to CDMA handoff threshold, CDMA to analog handoff threshold, handoff escalation interval, and number of paging channels. The handoff parameters may further include parameters associated with search window size for active set and candidate set search window size for neighbor set, search window size for remaining set, search window size for cell, sector size, soft handoff enhancement activation, soft slope, add intercept, drop intercept, pilot detection, and pilot drop threshold. Additionally, the handoff parameters may include parameters associated with alternative soft slope, alternative add intercept, alternative drop intercept, alternative pilot detection threshold, alternative pilot drop threshold, pilot offset, enable period-based reporting, enable threshold-based reporting, frame error threshold for reporting, and wait timer.

The timing and access parameters may include parameters associated with transmit antenna propagation delay, receive antenna propagation delay, maximum access channel message capsule size, access channel preamble length, time randomization for access channel probes, sector size, carrier assignment algorithm, radio frequency loading weight factor, and paging channel neighbor list selection. The timing and access parameters may also include parameters associated with access channel probe back-off range, access channel probe sequence back-off range, maximum slot cycle index, nominal transmit power offset, initial power offset for access, number of access probes, access probe power increment, acknowledgement timeout, and maximum access probe sequence request. The timing and access parameters may further include parameters associated with maximum access probe sequence response, number of pages, CDMA silent re-origination feature enabled, access entry handoff enable, CDMA access handoff, channel assignment into soft handoff, quick paging feature enabled, quick paging channel transmit power level, dynamic reallocation of assignment algorithm enabled, and number of access channels.

The subscriber access control parameters may include parameters associated with test carrier configuration, overload classes, send global system redirection, return from analog if failure, CDMA available, redirection destination, and redirection band. The subscriber access control parameters may also include parameters associated with redirect to CDMA channel number, enable extended global service redirection message, qualified by mobile protocol revision, and redirect to other system, redirect to other network.

One skilled in the art will readily appreciate that in other mobile communication system embodiments, other operational parameters may take the place of the operational parameters specifically enumerated above. The disclosed system is readily adapted to controlling and/or adjusting such other operational parameters. Additionally, while several specific parameter adjustment algorithms and/or methods are described in detail above, it is intended that other parameter adjustment algorithms will be comprehended by the present disclosure as well.

Figure 9:
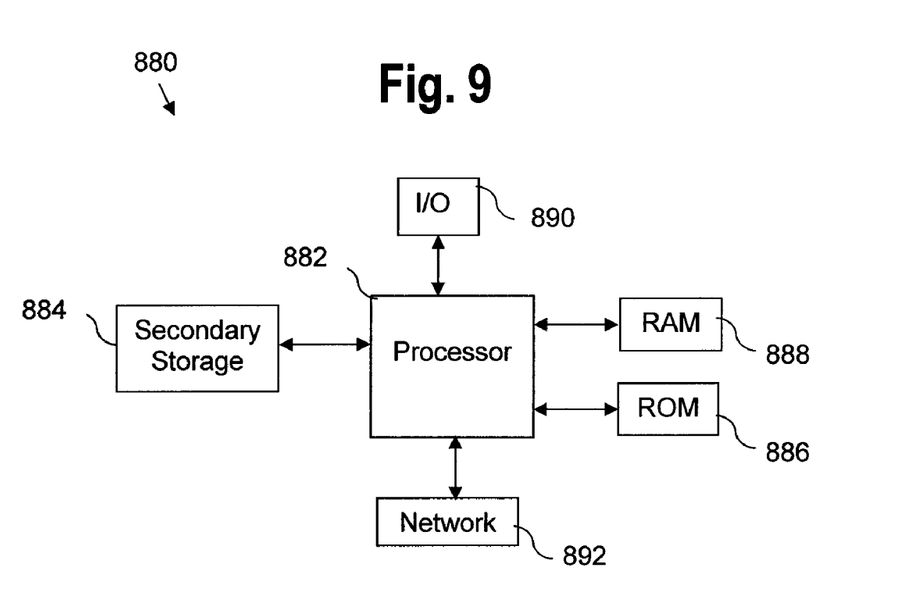
FIG. 9 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 9 illustrates a typical, general-purpose computer system, such as the server 102, suitable for implementing one or more embodiments disclosed herein. The computer system 880 includes a processor 882 (which may be referred to as a central processor unit or CPU) that is in communication with memory devices including secondary storage 884, read only memory (ROM) 886, random access memory (RAM) 888, input/output (I/O) devices 890, and network connectivity devices 892. The processor may be implemented as one or more CPU chips.

The secondary storage 884 is typically comprised of one or more disk drives or tape drives and is used for non-volatile storage of data and as an over-flow data storage device if the RAM 888 is not large enough to hold all working data. Secondary storage 884 may be used to store programs which are loaded into the RAM 888 when such programs are selected for execution. The ROM 886 is used to store instructions and perhaps data which are read during program execution. The ROM 886 is a non-volatile memory device which typically has a small memory capacity relative to the larger memory capacity of secondary storage. The RAM 888 is used to store volatile data and perhaps to store instructions. Access to both the ROM 886 and the RAM 888 is typically faster than to the secondary storage 884.

The I/O devices 890 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 892 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), worldwide interoperability for microwave access (WiMAX), and/or global system for mobile communications (GSM) radio transceiver cards, and other well-known network devices. These network connectivity devices 892 may enable the processor 882 to communicate with an Internet or one or more intranets. With such a network connection, it is contemplated that the processor 882 might receive information from the network, or might output information to the network in the course of performing the above-described method steps. Such information, which is often represented as a sequence of instructions to be executed using the processor 882, may be received from and outputted to the network, for example, in the form of a computer data signal embodied in a carrier wave.

Such information, which may include data or instructions to be executed using the processor 882 for example, may be received from and outputted to the network, for example, in the form of a computer data baseband signal or signal embodied in a carrier wave. The baseband signal or signal embodied in the carrier wave generated by the network connectivity 892 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 882 executes instructions, codes, computer programs, scripts which it accesses from hard disk, floppy disk, optical disk (these various disk based systems may all be considered the secondary storage 884), the ROM 886, the RAM 888, or the network connectivity devices 892. While only one processor 882 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A computer implemented method for dynamic communication adjustment, comprising:
    obtaining data associated with a base transceiver station, wherein the data comprises hand down failure data, carrier balance data, and dropped call data;
    comparing the hand down failure data to a hand down failure threshold;
    determining whether a carrier is balanced based on the carrier balance data when the hand down failure data is greater than the hand down failure threshold;
    comparing the dropped call data to a dropped call threshold when the carrier is balanced; and
    promoting adjustment of an operational parameter of the base transceiver station when the dropped call data is greater than the dropped call threshold, wherein the operational parameter is a dynamic hand down distance parameter.

2. The computer implemented method of claim 1, further comprising promoting adjustment of a radio frequency loading factor when the carrier is not balanced.

3. The computer implemented method of claim 1, wherein the promoting adjustment of the operational parameter comprises promoting adjustment of hand off parameters.

4. The computer implemented method of claim 1, further comprising promoting readjustment of at least one operational parameter based on an at least weekly comparison of subsequently obtained data associated with the base transceiver station to at least one threshold.

* * * * *